(12) United States Patent
Engellenner

(10) Patent No.: US 6,891,469 B2
(45) Date of Patent: May 10, 2005

(54) ELECTRONIC LOCATING SYSTEMS

(76) Inventor: Thomas J. Engellenner, 11 Birch Hill Rd., Newton, MA (US) 02165

( * ) Notice: Subject to any disclaimer, the term of this patent is extended or adjusted under 35 U.S.C. 154(b) by 0 days.

(21) Appl. No.: 10/145,516

(22) Filed: May 14, 2002

(65) Prior Publication Data

US 2002/0130775 A1 Sep. 19, 2002

Related U.S. Application Data

(63) Continuation of application No. 09/562,247, filed on May 2, 2000, now Pat. No. 6,388,569, which is a continuation of application No. 09/134,790, filed on Aug. 14, 1998, now Pat. No. 6,057,756, which is a continuation of application No. 08/478,866, filed on Jun. 7, 1995, now Pat. No. 5,798,693.

(51) Int. Cl.⁷ .............................................. G08B 26/00
(52) U.S. Cl. .................... 340/505; 235/385; 340/10.31; 340/10.33; 340/825.49; 705/28
(58) Field of Search ................... 340/505, 5.8, 10.1, 340/10.31, 10.33, 825.49; 235/385; 705/22, 28; 198/358, 349, 349.95

(56) References Cited

U.S. PATENT DOCUMENTS

| | | | | |
|---|---|---|---|---|
| 2,774,060 A | * | 12/1956 | Thompson | 340/572 |
| 2,812,427 A | * | 11/1957 | Magondeaux | 342/50 |
| 2,899,546 A | * | 8/1959 | Hollmann | 342/50 |
| 3,117,277 A | * | 1/1964 | Magondeaux | 342/50 X |
| 3,373,425 A | * | 3/1968 | Barischoff | 342/187 |
| 3,500,373 A | * | 3/1970 | Minasy | 340/572 |
| 3,568,161 A | * | 3/1971 | Knickel et al. | 340/992 |
| 3,624,631 A | * | 11/1971 | Chomet et al. | 340/572 X |
| 3,689,885 A | * | 9/1972 | Kaplan et al. | 340/825.34 |
| 3,713,102 A | * | 1/1973 | Martin | 340/825.34 |
| 3,740,742 A | * | 6/1973 | Thompson et al. | 340/572 |
| 3,810,147 A | * | 5/1974 | Lichtblau | 340/572 |
| 3,818,472 A | * | 6/1974 | Mauk et al. | 340/572 |
| 3,820,104 A | * | 6/1974 | Fearon | 340/572 |
| 3,828,337 A | * | 8/1974 | Lichtblau | 340/572 |
| 3,899,671 A | * | 8/1975 | Stover | 342/50 X |
| 3,913,219 A | * | 10/1975 | Lichtblau | 29/592.1 |
| 3,915,284 A | * | 10/1975 | Knockeart et al. | 198/349 |
| 3,997,930 A | * | 12/1976 | Reeves | 441/9 |
| 4,058,217 A | * | 11/1977 | Vaughan et al. | 209/559 |
| 4,075,632 A | * | 2/1978 | Baldwin et al. | 342/50 X |
| 4,101,873 A | * | 7/1978 | Anderson et al. | 340/539 |
| 4,104,630 A | * | 8/1978 | Chasek | 342/44 |
| 4,181,893 A | * | 1/1980 | Ehmke | 340/825.48 |
| 4,222,517 A | * | 9/1980 | Richardson | 235/493 |
| 4,240,002 A | * | 12/1980 | Tosi et al. | 310/324 |
| 4,271,352 A | * | 6/1981 | Thomas | 235/375 |
| 4,300,183 A | * | 11/1981 | Richardson | 361/152 |
| 4,303,904 A | * | 12/1981 | Chasek | 235/384 |
| 4,356,477 A | * | 10/1982 | Vandebult | 340/572 |
| 4,373,163 A | * | 2/1983 | Vandebult | 343/842 |
| 4,382,256 A | * | 5/1983 | Nagata | 340/825.44 |

(Continued)

FOREIGN PATENT DOCUMENTS

| | | | |
|---|---|---|---|
| EP | 0078401 | * | 5/1983 |
| EP | 0089667 | * | 9/1983 |
| EP | 0153613 | * | 9/1983 |
| GB | 2133950 | * | 8/1984 |
| GB | 2156630 | * | 10/1985 |
| WO | 01437 | * | 4/1982 |

*Primary Examiner*—Thomas Mullen
(74) *Attorney, Agent, or Firm*—Reza Mollaaghababa; Nutter McClennen & Fish LLP

(57) ABSTRACT

Methods and apparatus are disclosed for location of objects to facilitate retrieval, filing, security, inventory stockkeeping and the like. The methods and apparatus employ a tag element associated with each object-to-be-located, and interrogation system for searching one or more spatial regions for such tagged items, as well as mechanisms for identifying objects within the interrogated region.

13 Claims, 8 Drawing Sheets

U.S. PATENT DOCUMENTS

| | | | | |
|---|---|---|---|---|
| 4,426,712 A | * | 1/1984 | Gorski-Popiel | 375/343 |
| 4,429,302 A | * | 1/1984 | Vandebult | 340/572 |
| 4,476,459 A | * | 10/1984 | Cooper et al. | 340/572 |
| 4,476,469 A | * | 10/1984 | Lander | 340/825.49 |
| 4,484,184 A | * | 11/1984 | Gregor et al. | 340/572 |
| 4,495,487 A | * | 1/1985 | Kavesh et al. | 340/572 |
| 4,498,076 A | * | 2/1985 | Lichtblau | 340/572 |
| 4,507,653 A | * | 3/1985 | Bayer | 340/539 |
| 4,510,489 A | * | 4/1985 | Anderson, III et al. | 340/572 |
| 4,523,178 A | * | 6/1985 | Fulhorst | 340/426 |
| 4,539,567 A | * | 9/1985 | Brewer | 342/351 |
| 4,553,136 A | * | 11/1985 | Anderson, III et al. | 340/572 |
| 4,566,121 A | * | 1/1986 | Samyn | 382/135 |
| 4,598,275 A | * | 7/1986 | Ross et al. | 340/573 |
| 4,656,453 A | * | 4/1987 | Reeder | 340/572 |
| 4,673,932 A | * | 6/1987 | Ekchian et al. | 340/825.54 |
| 4,739,328 A | * | 4/1988 | Koelle et al. | 342/44 |
| 4,776,464 A | * | 10/1988 | Miller et al. | 209/3.3 |
| 4,783,803 A | * | 11/1988 | Baker et al. | 704/252 |
| 4,791,412 A | * | 12/1988 | Brooks | 340/572 |
| 4,922,229 A | * | 5/1990 | Guenst | 340/572 |
| 4,924,211 A | * | 5/1990 | Davies | 340/573 |
| 4,940,964 A | * | 7/1990 | Dao | 340/438 |
| 4,992,776 A | * | 2/1991 | Crossfield | 340/551 |
| 5,006,996 A | * | 4/1991 | Nakamura et al. | 235/385 X |
| 5,103,209 A | * | 4/1992 | Lizzi et al. | 340/572 |
| 5,103,235 A | * | 4/1992 | Clemens | 343/742 |
| 5,218,189 A | * | 6/1993 | Hutchison | 235/439 |
| 5,450,070 A | * | 9/1995 | Massar et al. | 340/572 X |
| 5,519,381 A | * | 5/1996 | Marsh et al. | 340/572.1 |
| 5,627,517 A | * | 5/1997 | Theimer et al. | 340/572 |
| 5,640,151 A | * | 6/1997 | Reis et al. | 340/572.1 X |
| 5,786,764 A | * | 7/1998 | Engellenner | 340/572.1 |
| 5,798,693 A | * | 8/1998 | Engellenner | 340/505 |
| 6,057,756 A | * | 5/2000 | Engellenner | 340/505 |
| 6,388,569 B1 | * | 5/2002 | Engellenner | 340/505 |

* cited by examiner

ELECTRONIC LOCATING SYSTEMS

REFERENCE TO RELATED APPLICATIONS

This application is a continuation of U.S. patent application Ser. No. 09/562,247, filed May 2, 2000, now U.S. Pat. No. 6,388,569, which is a continuation of U.S. patent application Ser. No. 09/134,790, filed Aug. 14, 1998, now U.S. Pat. No. 6,057,756, which is a continuation of U.S. patent application Ser. No. 08/478,866, filed Jun. 7, 1995, now U.S. Pat. No. 5,798,693.

BACKGROUND OF THE INVENTION

The technical field of this invention is electronic communication systems and, in particular, systems for locating and/or retrieving objects by electromagnetic interrogation of a spatial region to detect the presence (or absence) of an object.

Searching for possessions, tools and other objects is often a time-consuming task. Since the beginning of history, people have sought to solve this problem in many ways by devising implements to help keep track of useful objects. For example, one of the earliest metal implements devised by man was the bell, used by shepherds and other handlers of animals to locate their flocks or herds. As civilization has developed, so has the need for locating and identifying useful objects or possessions. Modern society faces an unparalleled proliferation of personal and business objects, many of which are either visually indistinguishable from each other or are difficult to examine readily. Examples of such objects include office files, business inventory, retail merchandise, luggage, freight and other commercial or personal items.

Office files are a particularly perplexing problem since it is common for more than one individual to work on a file, e.g., to add papers, make notations or otherwise review and/or revise the file's contents. Office productivity is lost whenever a file is misplaced or can not be located. Accuracy and efficiency are also lost whenever papers can not be placed into an appropriate file in a timely fashion.

Another area where tracking of objects is of critical importance is in shipping, where packages destined for diverse locations must be stored and then routed to particular carriers or vehicles. This problem is particularly acute in luggage handling where lost articles of luggage can be especially vexing to passengers. At present, visual tags are used to identify the destination of luggage. However, there is no simple way to verify if all the luggage intended for a particular destination has been loaded on the proper carrier, and it is difficult, even with visual tags, to find misplaced or misrouted items of luggage.

Similarly, the management of retail items, such as clothing, or stock parts for manufacturing purposes often requires inventory-taking. If an item can not be located, e.g., an article of clothing in a particular size or a manufacturing part of particular characteristics, then a sale is lost or a manufacturing order goes unfilled. Moreover, the business manager may order supplemental items, not knowing that a supply exists on the premises in some unidentified location.

Recently, a number of electronic finding aids have been developed. For example, many cordless telephones now come equipped with a radio receiver to assist in their location in event that the telephone headset is misplaced. A transmitter incorporated into the charger/line interface module emits a signal that causes the headset to ring when a button is activated on the interface module. Similarly, the problem of lost keys can sometimes be remedied by a key chain tag which generates an alarm in response to certain sonic signals, such as a sharp whistle or a loud slap.

Unfortunately, conventional electronic finding aids are not capable of tracking large inventories or large numbers of files. In many cases, the simplicity of the finding aid system (e.g., the nature of the transmission signal or the receiver) makes it impossible to distinguish one object from another. In other cases, the overlap of signals from various sources causes too much interference when a plurality of objects need to be located. There exists a need for better electronic location systems, particularly systems that can accommodate the tracking of large numbers of files, items of inventory or the like.

There also exists a need for systems and methods that would permit automatic inventory-taking of files or merchandise on a regular basis (e.g. daily or on another periodic basis), as well as permit immediate or real time location and retrieval of objects in diverse environments.

Moreover, simple systems for locating and/or retrieving objects which can be incorporated into a conventional office or commercial data processing or communications infrastructure would likewise enhance efficiency while also achieving a cost economy as a result of integration with existing hardware and/or software.

SUMMARY OF THE INVENTION

Methods and apparatus are disclosed for location of objects to facilitate retrieval, filing, inventory stock-keeping, security and the like. The methods and apparatus employ a tag element associated with each object to be located, and an interrogation system for searching one or more spatial regions, as well as mechanisms for identifying objects within the interrogated region.

In one simple embodiment suitable, for example, for inventory control and security purposes, the tag element can be a electromagnetic antenna and/or signal receiver which responds either passively or actively to announce the presence (or absence) of an object within a controlled region defined by a broadcasted electromagnetic interrogation signal, e.g., a low power radio or microwave frequency electromagnetic radiation (EMR) transmission, or a time-varying magnetic field.

In one aspect of the invention, the tags can include a coding mechanism for uniquely defining particular objects, thereby facilitating location (and retrieval, if desired) of one or more desired objects from a plurality of objects present within an interrogated region (e.g., an office, file room, retail floor display or stockroom). This embodiment is particularly useful, for example, in locating specific files within an office or other workplace environment, in locating merchandise within a store, or in locating specific stock within a warehouse or stockyard.

One or more interrogation signal generators, or search beacons, can be used to search each interrogation region. The beacons can be simple electromagnetic field generators (e.g., radio transmitters or magnetic field coils) which merely cause a specific tag to respond, or they can be more complex. In one preferred embodiment, the beacons can be constructed as transceivers (or operated in conjunction with a set of distributed receivers) to both transmit an interrogation signal and receive a responsive signal, echo, or otherwise sense a field perturbation, indicating the presence of a specific tagged item within the interrogation region.

Moreover, the beacons can poll the various regions for all tagged items and then take a census of each region's contents. When serving in a census-taking role, the beacons can cooperate with a master controller to report the census results and, thereby, construct a master census of all tagged items within the controlled system. This aspect of the invention is particularly useful in office environments, for example, where files are often moved during the course of a day. An individual seeking access to a file need only consult the master controller for the last known location of the file. This aspect of the invention is also useful in keeping track of parcels, freight or baggage during transit. By conducting censuses on a periodic basis, e.g., at the beginning of a day and hourly during the course of business, the location of all tagged items can be readily tracked.

In a further aspect of the invention, systems and methods are disclosed whereby a user can interactively request the location of an object, and a controller can check stored census data to determine the last known location of the object. The system can then interrogate the region of the last known location to verify that the object is still there. If the object is found at the same location, the user is immediately notified. If the object is not found at its last census location, other regions can be polled either globally or on a region-by-region basis to locate the object. The user is then notified of the new location and the census is updated either entirely or partially based on the search protocol chosen.

The tag coding mechanism can take a variety of forms. For example a resonant circuit can be employed which responds to a predefined sequence of electromagnetic radiation, e.g., radio waves or the like, by transmitting a responsive signal to indicate the object's presence within the interrogation region. The resonant circuit can take the form of a tapped delay line or tank circuit which resonates, accumulates or amplifies an electronic signal in response to a specific frequency of radiation (or modulation pattern) in a broadcasted interrogation signal. In another embodiment, a reflecting delay line can be constructed employing a piezoelectric reflector to receive and/or retransmit electromagnetic radiation. In yet another embodiment, the tag elements can incorporate a magnetic material, for example, a ferromagnetic marker or the like, which interacts with a time varying magnetic field in such a way as to perturb the magnetic field and, thereby, announce the item's presence within the interrogated region.

By transmitting a programmed interrogation signal which has a specific code, e.g. a signal modulated with a particular time-varying frequency or amplitude pattern, which matches the code of one tag element (or a subset of the tags), the present invention ensures that only one tagged object (or only one class of tagged objects) will respond, thereby permitting a user to search for, and locate, specific objects.

The interrogation signal can be implemented by low power, safe, high frequency radio waves, such as broadcast frequency signals in the range of about 10 kHz to about 1000 MHz, or similar low power, safe, microwave signals in the range from about 1000 MHz to about 2200 MHz. Frequencies allocated by the FCC for industrial, scientific and medical purposes, which may be useful in implementing the present invention, include the 5 MHz, 13.5 MHz, 27 MHz, 40 MHz, 49 MHz, 132 MHz and 905 MHz bands. In one embodiment, the invention can be implemented using one or more of the specific frequencies allocated by the FCC within the 49 MHz band which support and permit digitally encoded transmissions. Alternatively, digital signal transmissions within the 900 MHz band can be employed. Various other frequencies can also be employed in accordance with FCC and other regulations. The term "radio frequency" as used herein is intended to broadly encompass electromagnetic radiation at frequencies ranging from about $10^4$ Hz to about $10^{14}$ Hz, including both conventional broadcast and microwave signals.

Modulated magnetic fields can also be used in certain applications. For example, the interrogation means can generate a magnetic field of about 0.01 Oersteds to about 1.0 Oersted modulated at a frequency ranging from about 0.1 kHz to about 100 kHz to interact with coded ferromagnetic tag elements and, thereby, indicated the presence of tagged objects within the interrogation region. As used herein, the term "electromagnetic signal" is intended to encompass both electromagnetic radiation tranmissions and time-varying magnetic fields.

Alternatively, the broadcast signal can be fixed waveform, e.g., a selected frequency or modulation pattern which induces different responses by particular tag elements, which are sensed by a receiver which is not associated with the tag but located within the interrogation region, thereby allowing the user to poll-controlled premises (or smaller spatial regions, such as individual offices, storerooms, or filerooms) in order to inventory the contents of such premises or regions, or to identify a particular item by its characteristic response. In such an embodiment, a predefined (e.g., fixed or swept) frequency interrogation signal, for example, having a frequency ranging from 1500 to about 2500 kHz can be employed with a series of uniquely coded resonant tag elements. In one approach, the tags are distinguishable by differences in their capacitance and/or inductance, resulting in distinctive "signatures" when they resonate in response to the interrogation signal. In this embodiment, a monitor situated in each controlled spatial region recognizes each response to an interrogation signal and determines from the response (e.g., an electromagnetic echo signal or field perturbation) that certain controlled objects are present (or absent). In addition to the responsive signal which is communicated to an electronic monitor or receiver, the tag can be constructed to emit an audible signal which informs nearby individuals that a search request has been initiated.

Thus, the present invention can perform as an electronic watchman in which a plurality of individual transceivers, or systems of transmitters and monitors, serve as beacons to generate search signals within certain regions and as monitors to receive signals back which identify the tagged objects within the interrogated zone. Distributed beacons can be activated either or all at once or sequentially, and preferably are in communication either with each other or with a central controller for periodic census-taking. For example, such a system can be used to conduct a general census at the end of business (or the beginning of a work shift). Alternatively, periodic interrogations can be conducted throughout a workday (e.g., once every hour or other predefined time period) to provide an updated census of inventory, files or other tagged items. Preferably, the system can also provide for a user-initiated search at other times and thereby generate a current location census whenever a need for such arises.

In the context of office files, such a system represents a significant improvement over prior art systems that rely upon either manually-maintained records (such as sign-out cards) or bar-code type systems that likewise require individuals to process a file (e.g., by "wanding" it with a bar code reader) each time it is moved from one location to another. In the context of luggage tracking, the present invention represents a significant improvement in that it permits luggage handlers to verify that all luggage in a particular lot or location share a common destination (or route leg) and in at least some embodiments also allows the user to determine the number of pieces in a shipment and to initiate a search for lost items. Various other work environments, besides offices and transportation facilities, also can benefit from the present invention. For example, libraries where management of circulating collections is desired, or manufacturing facilities, where work-in-progress needs to be tracked, can likewise employ the present invention.

In a simple embodiment, the present invention can be used in conjunction with conventional tracking systems, such as manual, bar-coded or "wanded" location control systems, as a mechanism for alerting users that an article has not been properly logged in (or logged out). For example, a parcel or other object which is assigned to particular location can be tagged with a device according to the present invention which will beep or otherwise trigger an auditory signal if the article is removed without being re-coded for a new location.

Alternatively, the tags can be constructed to remain silent so long as they do not pass into a specific interrogation zone. Thus, a parcel or luggage item can be tagged to ensure that it does not leave the shipping dock without proper dispatch and, similarly, does not get routed to the wrong carrier or storage area. Such a system would likewise be useful in controlling the release of merchandise from a stockroom or files from a central filing area.

In another alternative embodiment, a predefined time delay can be established before the locating device is re-armed whenever it is coded for transfer. So long as the tagged object arrives at the intended destination within the predefined delay period, the alarm will not be activated. However, if the object is misplaced enroute, or delivered to the wrong destination, the alarm will be triggered when the delay period runs out. In yet another variation, the tag can be temporarily deactivated for transfer without pre-coding any new destination, thereby allowing a carrier a limited period of time to deliver an object to a new location. Once the object has been delivered, it can be logged in and the alarm would be deactivated.

More generally, the present invention encompasses systems that provide a signal whenever a tagged item is found in an area where its presence has not been preauthorized. If the tag's alarm is triggered, a responsible party can return the object to an authorized location, or override the alarm, for example, by reprogramming the tag to authorize a new destination. Such reprogramming can be performed at the original location (or any available intermediary waystation) or the user can proceed to the new location to log in the transfer.

In another embodiment, various users can be allowed access to the general census data to determine the location of files, luggage, collections or other tagged objects. In such embodiments, the electronic watchman functions of the invention can be integrated into (or otherwise linked to) existing office hardware such as networked personal computers (e.g. via an electronic mail subroutine or a separate application program) or telephones to permit a user to find a file or the like by reference to the last census (or to initiate a new search for a tagged object). Alternatively, such user interface elements can be stand-alone hardware devices which are situated in individual offices or other locations within the controlled region to provide ready access to the census and/or search facilities of the system. In either embodiment, the distributed poll-taking elements can be employed not only to detect the presence of a particular tagged item but also to alert nearby persons (e.g., office occupants, luggage handlers, shipping dispatchers, retail clerks or stockroom personnel) that a request has been made for determination of the location of the item.

While such search facilities simply can be activated by a keypad or "mouse-like" hand tool (usually in conjunction with a display screen), in another aspect of the invention, search operations can be initiated by voice-driven speech-recognition systems. The system can also respond in an audible fashion regardless of the form in which the search is initiated and thereby provide an inquirer with an oral report on the location of a file or more detailed information on its status (such as for example the length of time it has been in its present location) in response to an inquiry.

In yet another embodiment, the present invention can be employed as a system for controlling and locating inventory, especially retail items such as clothing. In many retail establishments, items for sale are already tagged with antipilferage devices. The tag elements of the present invention can be substituted for such antipilferage devices to permit not only protection from theft but also a capability for electronic inventory-taking and ready location of objects with particular attributes, e.g., specific colors, styles, or sizes of such items.

For example, clothing stores can employ the present invention to tag articles of merchandise according to a code that specifies at least attribute of the clothing or accessory item. When the customer requests an item in a different color or size, the tore clerk need only activate the search beacon to generate an interrogation signal and determine whether such an item having the coded characteristic is in stock. If the item is in stock, the search signal can simultaneously or subsequently activate an audible sound generator associated with, or incorporated into the tag, to permit rapid retrieval. Moreover, the system can be used in a census taking mode on a daily basis to check inventory against sale and alert the management to items that missing but unaccounted for as sales.

In another aspect of the invention, the tags can be constructed as transponders designed to receive a broadcasted interrogation signal either within a region or throughout a controlled system. The tag can be "tuned" to a search request or can further include means for comparing the transmitted search request with its own identification code and, if a match is determined, a responsive signal is generated by the tag to announce the location of the item.

In yet another aspect of the invention, the tag elements can be passive transducers, or powered by an alternative energy source such as a solar cell or a motion-activated dynamo to provide a source of electrical power which is largely or completely independent of conventional batteries. Such power sources can be used to generate a responsive electromagnetic signal or trigger an audible signal and thereby aid in manual location and retrieval of the tagged object.

The invention will next be described in connection with certain preferred embodiments. However, it should be clear that various changes and modifications can be made by those skilled in the art without departing from the spirit and scope of the invention.

BRIEF DESCRIPTION OF THE DRAWINGS

For a fuller understanding of the nature and objects of the present invention, reference should be made to the following detailed description and the accompanying drawings, in which:

FIG. 8A is a graph showing the amplitude of a frequency-swept interrogation signal over time, while FIG. 8B is a graph of the modulation frequency. FIG. 8C shows the effect of a tag element on the interrogation waveform, as sensed by a receiver near the tag. FIG. 8D is a similar graph showing the effect of a tag element with different resonant characteristics on the interrogation waveform, as sensed by a nearby receiver.

DETAILED DESCRIPTION

Figure 1:
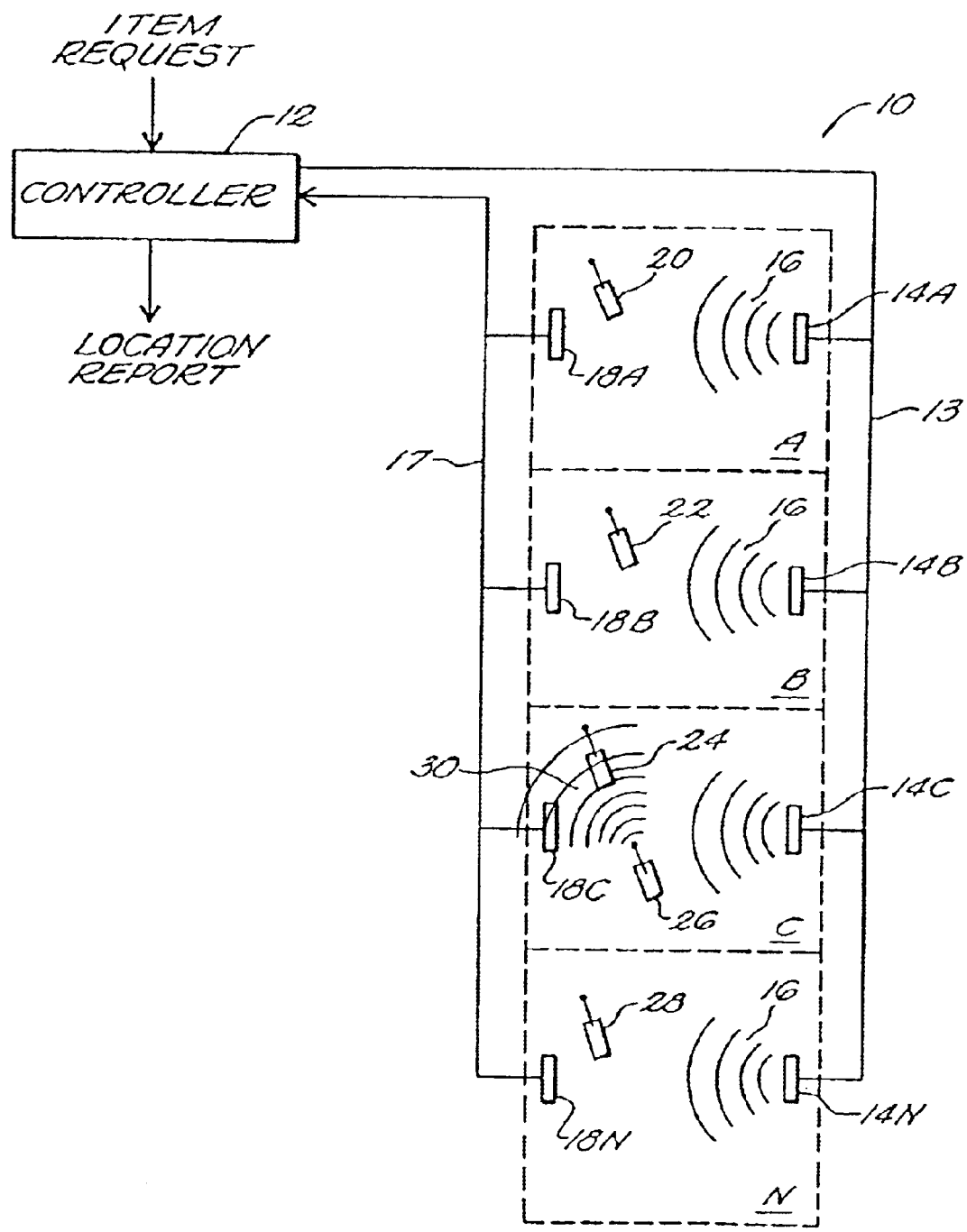
FIG. 1 is a schematic illustration of an electronic locating system according to the invention employing a plurality of distributed interrogation and detector elements.

FIG. 1 shows a system 10 for locating objects within a plurality of interrogation regions A, B, C . . . N, comprising a controller 12, a set of interrogating transmitters 14A, 14B, 14C . . . 14N, and a complementary set of receivers 18A . . . 18N. As illustrated, the transmitters and receivers are coupled to the controller 12 by transmitter bus 13 and receiver bus 17. In system 10, the controller 12 is typically activated by a request for an item, e.g., a request for the location of a file or shipment, and causes an interrogation signal 16 to be transmitted by at least one of the transmitters 14A . . . 14N. Various tagged objects 20 . . . 28 will be subjected to the interrogation signal 16, but only object—the one requested by the user—will respond to the interrogation signal. In the illustration of FIG. 1, object 26 is the object being sought and interrogation signal 16 triggers a responsive signal 30 by object 26 which identifies its location. This responsive signal 30 is detected by receiver 18C and the location of object 26 can then be reported, e.g., via receiver bus 17, to the controller 12. (It should be appreciated that various other communication paths or buses can also be incorporated into the system 10 to facilitate, for example, user inquiries, automatic reports on transfers or movements of objects, census taking, etc. Moreover, the "buses" need not be hard-wired electrical circuits but can, instead, be radio transmissions or the like.)

Figure 2:
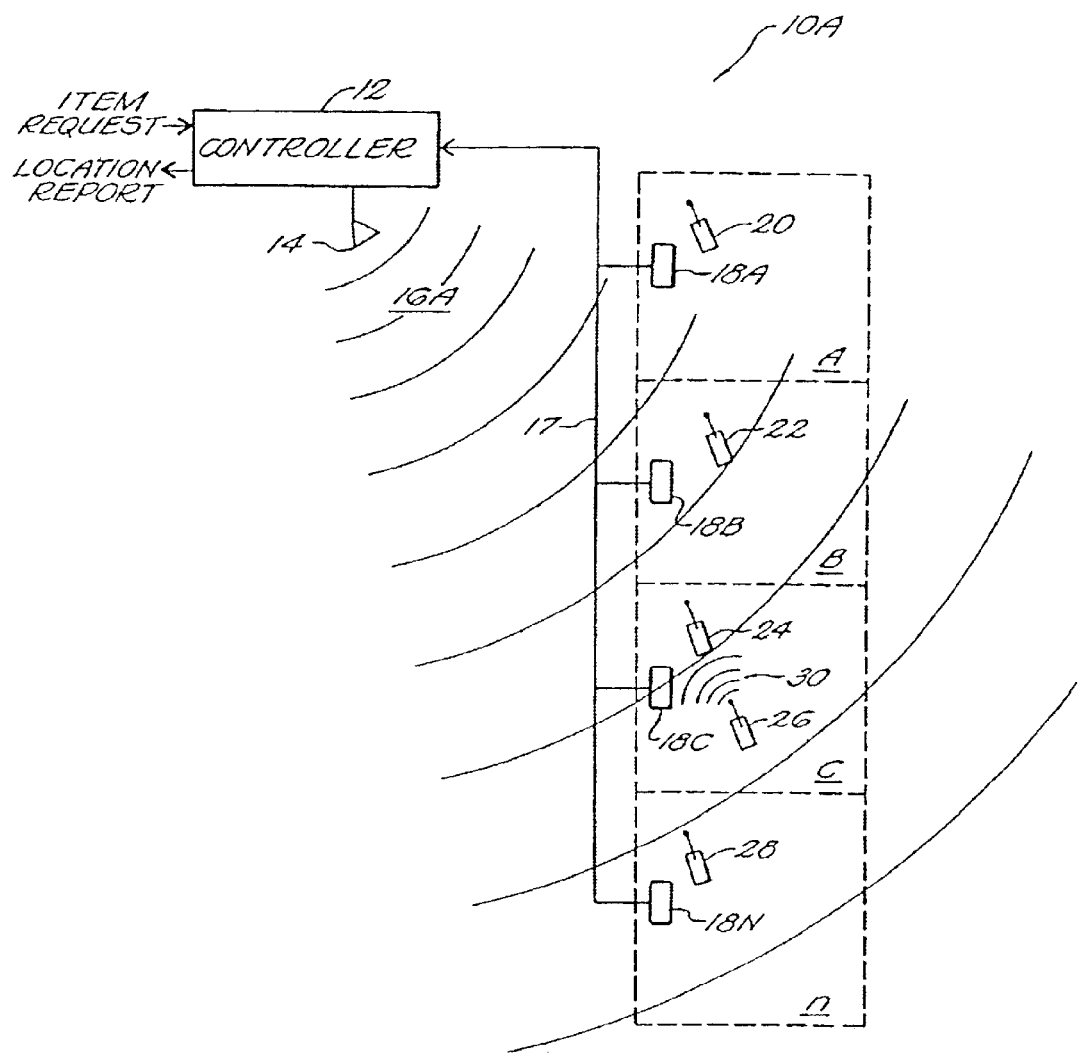
FIG. 2 is a schematic illustration of another embodiment of an electronic locating system according to the invention employing a single interrogation element to search a plurality of regions.

In FIG. 2 an alternative system 10A for locating objects within a plurality of interrogation regions A, B, C . . . N, is shown comprising a controller 12, a single interrogating transmitter 14, and a set of receivers 18A . . . 18N. As illustrated, the plurality of receivers are coupled to the controller 12 by receiver bus 17. In system 10A, the controller 12 is typically activated by a request for an item, e.g., a request for the location of a file or shipment, and causes an interrogation signal 16A to be broadcast transmitted by transmitter 14. Various tagged objects 20 . . . 28 again will be subjected to the interrogation signal 16A, but only object—the one requested by the user—will respond to the interrogation signal. In the illustration of FIG. 2, object 26 is again the object being sought and interrogation signal 16A triggers a responsive signal 30 by object 26 which identifies its location. This responsive signal 30 is detected by receiver 18C and the location of object 26 can then be reported, e.g., via receiver bus 17, to the controller 12.

Figure 3:
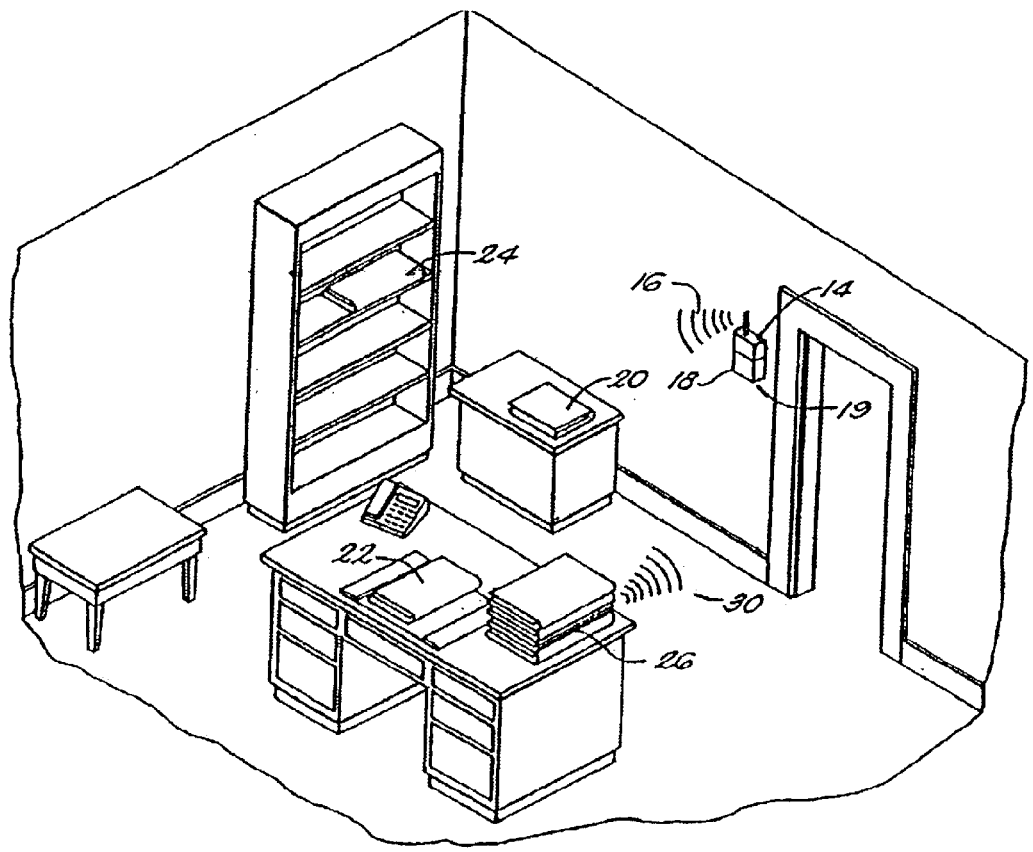
FIG. 3 is an illustration of another embodiment of the present invention in which the invention is employed to locate and/or inventory office files.

In FIG. 3, the present invention is illustrated in the context of an office environment. As shown, both the transmitter 14 and the receiver 18 are incorporated into a single, wall-mounted, unit 19. Transmitter 14, upon activation by a controller, transmits an interrogation signal 16 which serves as a search beacon for the entire office. Various files 20, 22, 24, and 26 are physically present within the interrogation zone defined by the transmitted signal 16, but only one file 26 has a tag that is responsive to the interrogation signal 16. File 26 responds to the interrogation signal 16 by emitting a responsive signal 30 which is then detected by the receiver 18. (The tag on file 26 can further include an audible signal generator which would alert the occupant of the office that a location inquiry for that particular file has been made by another.)

Figure 4:
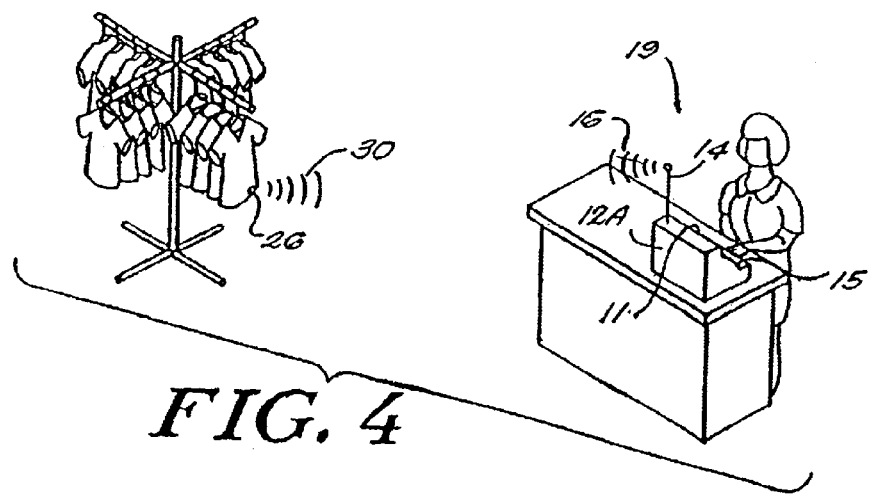
FIG. 4 is an illustration of yet another embodiment of the present invention in which the invention is employed to locate and/or inventory retail merchandise.

FIG. 4 shows another embodiment of the present invention in the context of a merchandise retail store in which an article of clothing of a particular type, size or style is sought for a customer. As shown, both the transmitter 14 and the receiver 18 can again be formed into a single unit 19 (which can also include the controller), that preferably is located close to the cash register or incorporated into a computer terminal at the check-out counter. As shown in FIG. 4, transceiver unit 19 is incorporated into a computer terminal 12A, including a display 11 and a keyboard user interface 15. Transmitter 14, upon a location request, transmits an interrogation signal 16 which serves as a search beacon for a region of (or the entire) store. Various articles are physically present within the interrogation zone defined by the transmitted signal 16, but only one article 26 has a tag that is responsive to the interrogation signal 16. Article 26 responses to the interrogation signal 16 by emitting a responsive signal 30 which in this instance can be simply an audible signal that is then used by the store employee or the customer to locate the article of merchandise.

(Although illustrated in the context of clothing apparel, it should be clear that the invention can likewise be applied to other retail applications, such as record and compact disc sales, video tape rentals, etc., as well as other commercial businesses, such as stockrooms, mail order houses, shipping and freight handling operations. The invention can also be used in libraries and governmental record depositories.)

Figure 5:
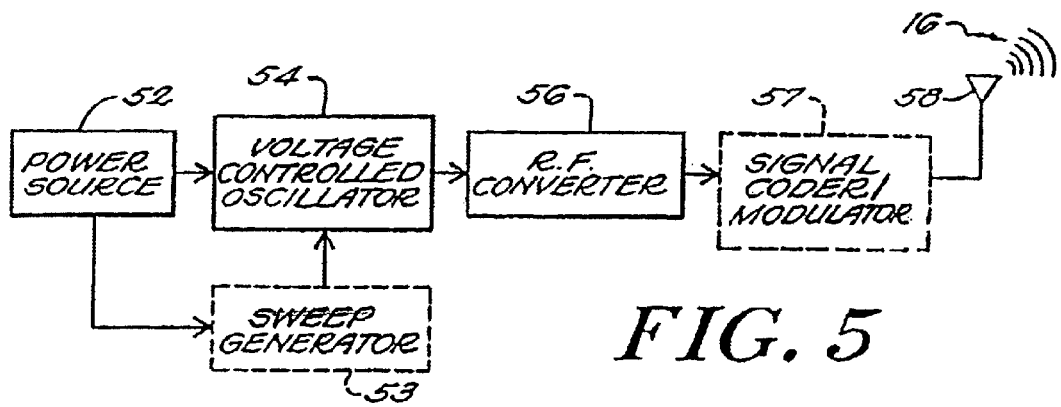
FIG. 5 is a more detailed schematic illustration of an interrogating radio frequency transmitter for use in the present invention.

FIG. 5 is a schematic illustration of one transmitter 50 useful in connection with the present invention to generate an interrogation signal. Transmitter 50 includes a power source 52, a voltage controlled oscillator 54, a radio frequency converter 56 and antenna 58. The transmitter can further optionally include a sweep generator 53 and/or a signal coder/modulator 57. In use, the transmitter 50 generates a time-varying electromagnetic signal, the frequency of which is determined by the oscillator 54 and converter 56.

In some applications it is sufficient for the transmitter 50 to generate a simple sinusoidal waveform for interrogation purposes. The interrogation signal be transmitted at a radio broadcast frequency ranging from about 10 kHz to about 1000 MHz, or at a microwave frequency in the range from about 1000 MHz to about 2200 MHz. These ranges are particularly useful in the United States because the U.S. Federal Communications Commission ("FCC") has allocated various frequencies within these bands of electromagnetic radiation for use in low power, communications and remote control applications without need for licensure. Frequencies allocated by the FCC for industrial, scientific and medical purposes, which may be useful in implementing the present invention, include the 5 MHz, 13.5 MHz, 27 MHz, 40 MHz, 49 MHz, 132 MHz and 905 MHz bands. In one embodiment, the invention can be implemented with signal coder 57 using one or more of the specific frequencies allocated by the FCC within the 49 MHz band (49.830, 49.845, 49.860, 49.875, 49.890 MHz) which support and permit digitally encoded transmissions. Alternatively, digital signal transmissions within the 900 MHz band can be generated by coder 57. Various other frequencies can also be employed in accordance with FCC and other regulations.

Various modulation schemes can be used to encode the interrogation signal, including, for example, amplitude modulation, frequency modulation, phase modulation, pulse coded modulation and pulse duration modulation. In another embodiment, the interrogation signal can employ a linear FM "chirped" waveform in conjunction with a matched filter in the receiver to improve resolution. Alternatively, "Barker" phase coding techniques can be used. These approaches are particularly useful when the tag includes a active receiver component, as discussed in more detail below.

Figure 6:
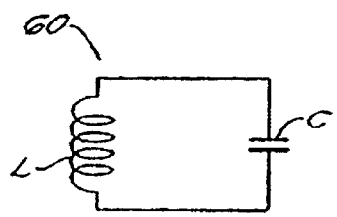
FIG. 6 is a schematic diagram of a tuned circuit for use as a passive tag.
Figure 6A:
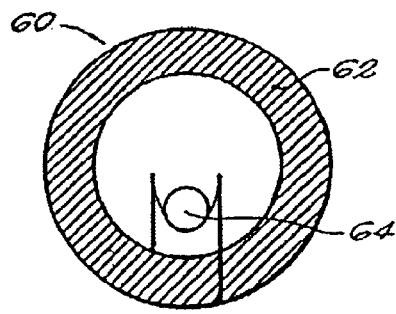
FIG. 6A is a further illustration of the construction of one embodiment of a tuned circuit tag of FIG. 6.

FIG. 6 is a schematic illustration of a simple tuned circuit 60 which can be employed as a passive tag element to respond to an electromagnetic signal. Circuit 60 comprises an inductance L and a capacitance C in a parallel, resonant-tank configuration. By appropriate choice of the inductance and capacitance values, the tuned circuit 60 is designed to respond only to electromagnetic radiation at a particular frequency. At the "resonant frequency," the circuit 60 will absorb a portion of the energy in an interrogation signal, converting the energy into a current flowing in the circuit 60. The energy is then dissipated by the tank circuit as a re-radiated, secondary or responsive electromagnetic signal. A simple embodiment of tank circuit 60 is shown in FIG. 6A in which circuit 60 is formed by a spiral wound inductive coil 62 and a conventional capacitor 64. (Various other fabrication techniques can be employed to create the tank circuit. For example, the circuit 60 can be formed by etched foil techniques with an etched spiral pattern serving as the inductor and a pair of conductive surfaces separated by an insulator serving as the capacitor.)

Referring back to FIG. 5, if an interrogation signal 16 is transmitted by transmitter 50, the electromagnetic energy in such signal will interact with various objects in a predefined zone. In particular, interrogation signals at certain frequencies will excite resonant circuits which are tuned to such frequencies. Tags which incorporate such resonant circuits will respond to an interrogating modulation pattern by resonating at a characteristic rate and such resonant condition can be detected by a gated detector in a receiver. Other resonant circuits with different characteristics will either not respond at all or respond with a different "signature."

For example, the transmitter 50 of FIG. 5 can employ a frequency sweeping generator 53 such that only a portion of the signal is absorbed by the circuit. A time varying matched filter or filter bank can be employed in a receiver to detect the presence of a particular object based on its absorption profile.

Figure 7:
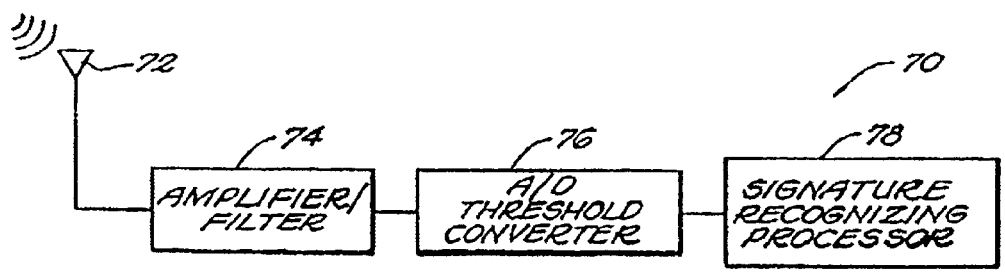
FIG. 7 is a schematic illustration of a receiver for use in the present invention.

In FIG. 7, an illustrative receiver 70 is shown schematically. Receiver 70 can include an antenna 72, an amplifier/filter module 74, analog-to-digital thresholding circuitry 76 and a signature-recognizing digital processor 78. The antenna 72 serves to collect either electromagnetic echoes from a transmitter and/or re-emitted radiation (e.g., resonant frequency radiation) from a tag element, as discussed above. The collected signals are then amplified and/or filtered by the amplifier/filter module to suppress the broad band—or interrogation—signal and isolate the responsive signal from the tag's resonant circuit. The receiver 70 can further include an analog-to-digital converter assembly 76 which converts the analog signals from the amplifier/filter module 74 into digital representations of the response from each tag that has been excited within the interrogation region. These digital representations are then processed by a computer or other microprocessor to identify or inventory files within an interrogated region.

Figure 8A:
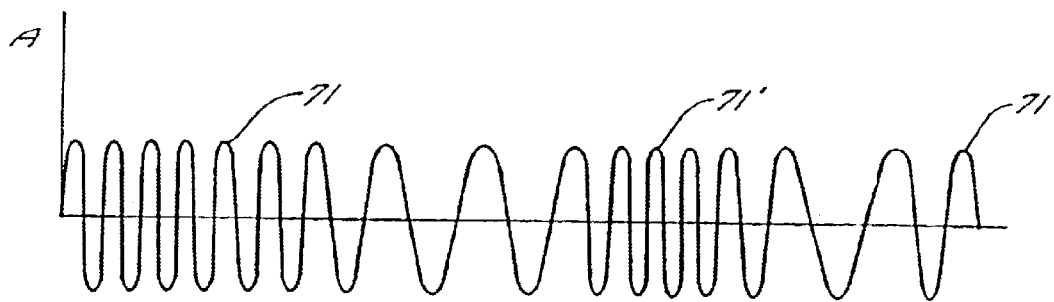
FIGS. 8A–8D are graphs illustrating an RF interrogation scheme.
Figure 8B:
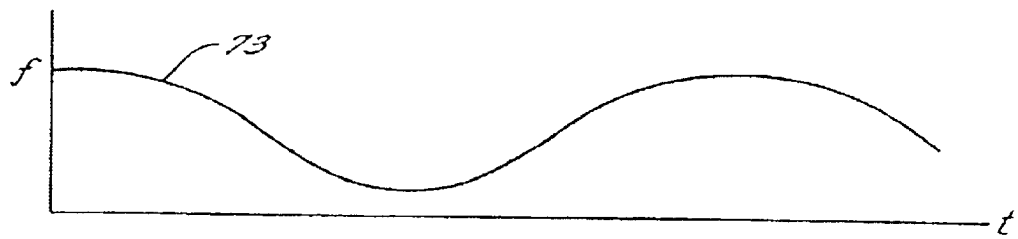
Figure 8C:
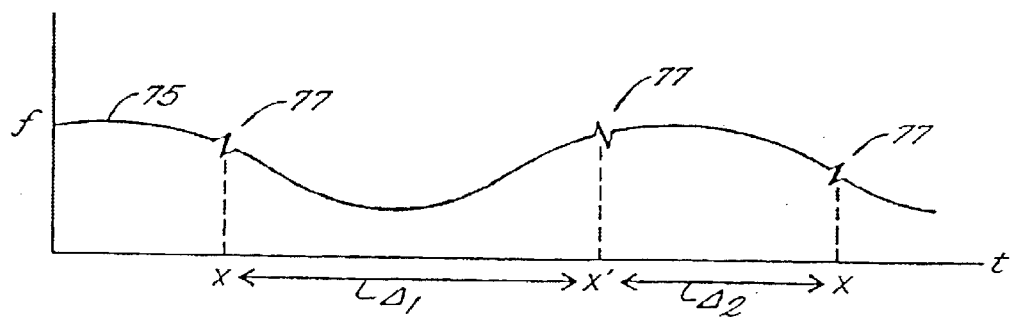
Figure 8D:
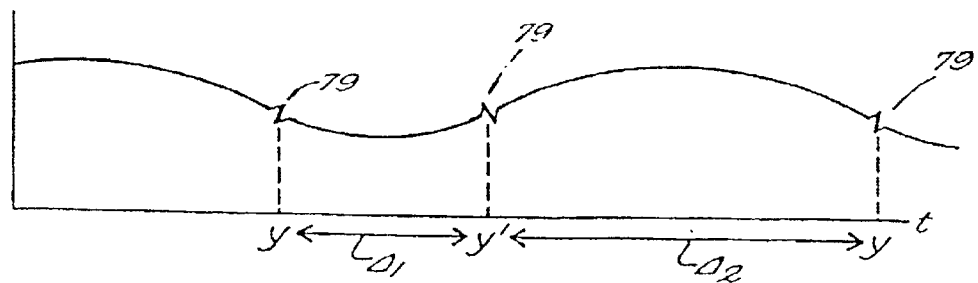

A detection scheme based on frequency modulation is illustrated schematically in FIGS. 8A–8D. These figures illustrate an RF interrogation scheme (although they are also applicable to analogous magnetic field interrogation schemes). FIG. 8A is a graph showing the amplitude of a frequency-swept interrogation signal over time, which can be generated for example by the transmitter of FIG. 5, while FIG. 8B is a graph of the modulation frequency (curve 73). FIG. 8C shows the effect of a first tag element on the interrogation waveform, as sensed by a receiver near the tag. In this illustration the tag element resonates at particular frequency which is generated by the transmitter twice during each sweep cycle, i.e. at points 71 and 71' as shown in FIG. 8A. These resonance points cause perturbations 77 and 79, respectively in the received signal. FIG. 8D is a similar graph showing the effect of a second tag element with different resonant characteristics on the interrogation waveform, as sensed by a nearby receiver. It is apparent that the two tags illustrated in FIGS. 8C and 8D have distinctly different signatures, defined by the timing of their signal perturbations (x and x' in the case of the first tag, versus y and y' in the case of the second tag). By determining the time delays $\Delta_1$ and $\Delta_2$, for each tag, the presence (or absence) of a particular tag within the interrogation zone can be readily determined. (It should also be clear that additional modulation patterns or more complex signals, e.g., quadrature phase shifting or the like, can also be used to further facilitate differentiation of tag elements.)

Figure 9:
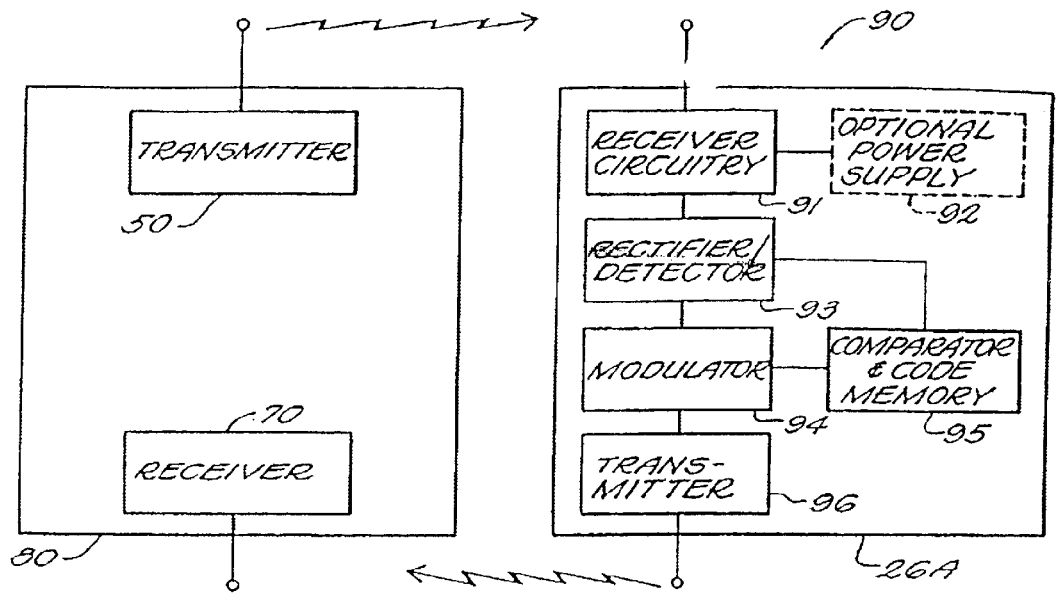
FIG. 9 is a schematic illustration of an active transponding tag element and an associated interrogating transceiver.

A more complex system 90, as illustrated in FIG. 9, employs a pseudo-random digital coding scheme in an interrogating transceiver 80 and/or in a similar coded transponder tag 26A. In this embodiment, the transceiver 80 includes a front-end transmitter 50 which generates a digitally encoded signal. The signal can be chosen to facilitate a response from only one uniquely coded tag element or the interrogation signal can be a general census call, triggering a response from all tags within the interrogation zone. The receiver component 70 of the transceiver can include a coded signal detector which senses the transponder signal and correlates it with a stored code to identify the tag (or tags) present in the interrogation zone.

The tag of FIG. 9 can be either passive or active. In the passive mode, the tag circuitry simply accumulates and then returns a signal, if the interrogation signal matches a predefined code sequence stored in the tag's circuitry. In an active mode the tag element further includes a battery or similar source of power, e.g. a solar cell, which assists in signal amplification, detection and/or waveforming. As shown in FIG. 9, the tag transponder 26 can include receiver circuitry 91, optional power supply 92, a rectifier/detector and waveformer 93, a comparator (with associated code memory) 95, a modulator/encoder 94 and a transmitter 96. In use, an interrogation signal is received by the receiver module 91 and decoded by detector module 93. The detector generates a waveform which can be returned to the interrogating transceiver 80 via transmitter 96, if the encoded interrogation signal correlates with a sequence stored in the code memory 95.

Figure 10:
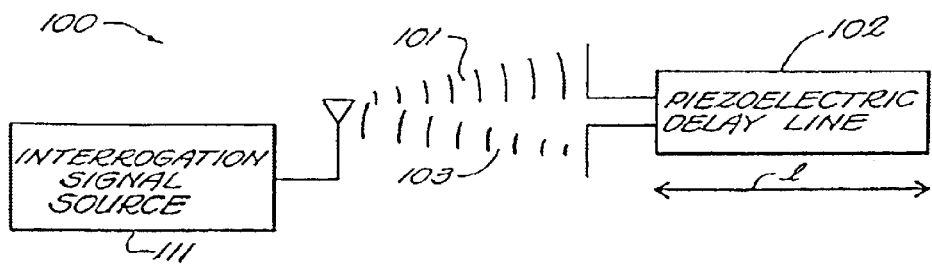
FIG. 10 is a schematic illustration of a piezoelectric transponding tag element.

In FIG. 10 a system 100 based on a piezoelectric delay line is shown. A pulse electromagnetic interrogation signal 101 is employed together with a piezoelectric crystal 102 or the like which responds with an echo if the pulses are transmitted at a frequency that matches at least one of the crystal's resonant characteristics. The echo 103 can be detected by a simple receiver (or an integrated transceiver). The piezoelectric crystal has an end face that determines the round trip transit time (e.g., based on the length l of the crystal 102). This system 100 is particularly useful in passive tag structures.

Figure 11:
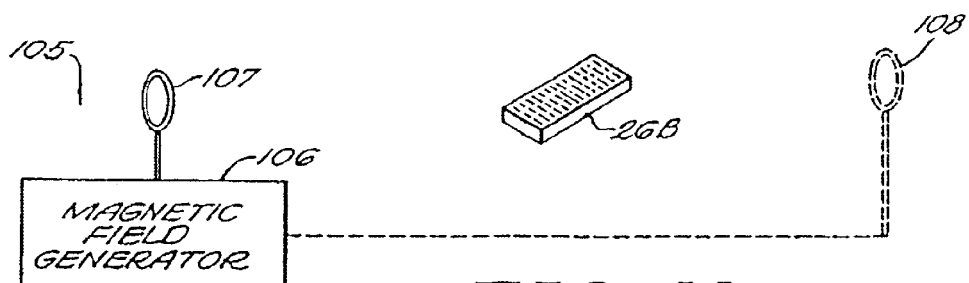
FIG. 11 is a schematic illustration of another alternative electronic locating system according to the invention employing a magnetic field as an interrogation signal.
Figure 12:
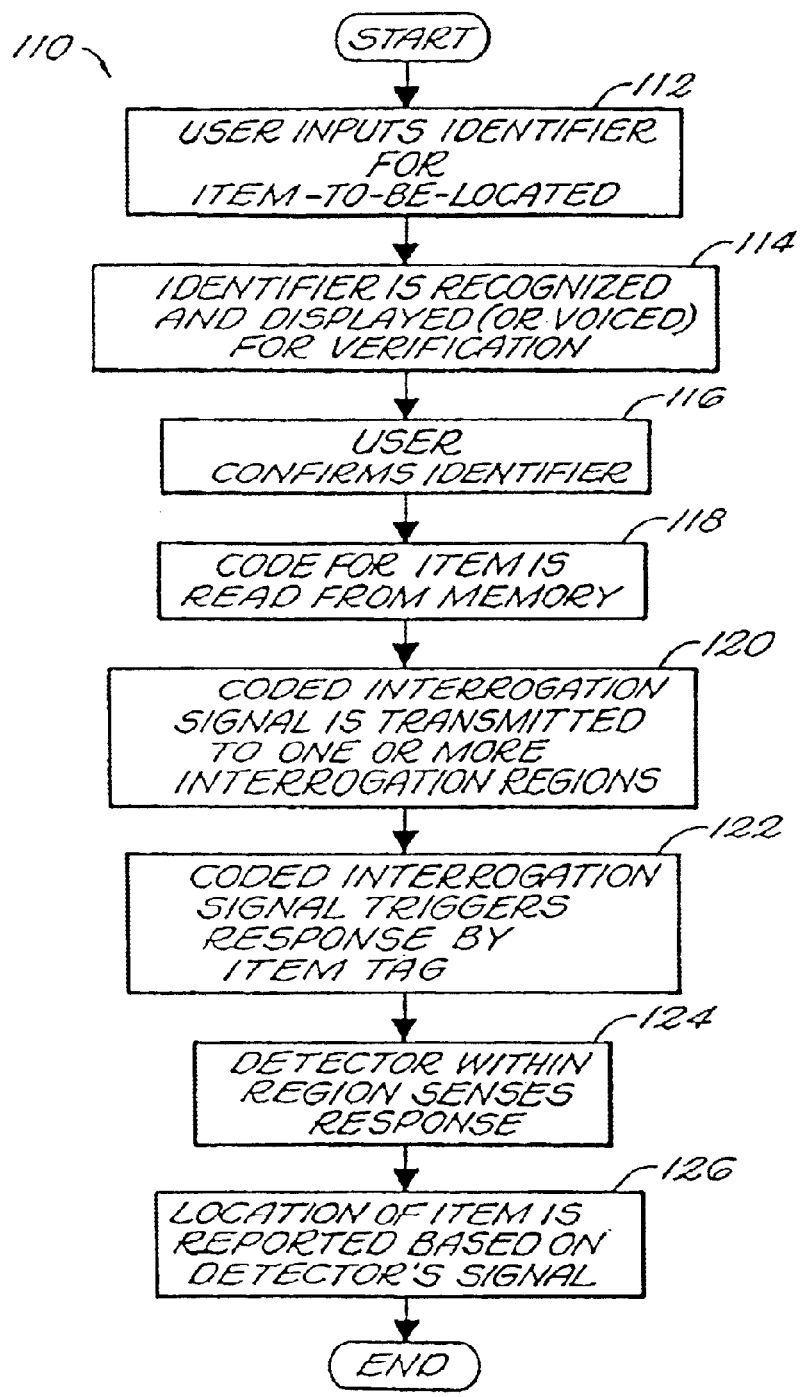
FIG. 12 is a flow diagram of a basic retrieval protocol according to the invention.

In FIG. 11 yet another system for locating objects is shown based on a oscillating magnetic field and the magnetic tags which are constructed to perturb the oscillation at a specific frequency. In the illustrated embodiment, the system 105 includes an oscillating magnetic field generator 106 which provides a magnetic field of variable frequency within an interrogation region, and at least one tag element 26B which comprises a magnetostrictive structure formed, for example, of ferromagnetic material and magnetically biased such that it will mechanically resonate at a predefined frequency within the variable frequency band of the interrogating field generator 106. When the magnetostrictive material resonates, this will perturb the field sensed either on the coil 107 of field generator 106 or on a second pick-up coil 108. (The interrogation and detection scheme described above in connection with RF interrogation can also be used for magnetic tags having analogous signature characteristics.) FIG. 12 illustrates a process for locating objects which can be used in the present invention. In this system 110, an initial step 112 is taken when the user inputs the identifier for the item-to-be-located. This can be done by keyboard entry, other touch sensitive mechanisms or by voice. In the next step 114, the system can acknowledge the search request either by a displayed or voiced response indicating that the identifier is recognized. In step 116, the user can then confirm that the identifier is indeed the identifier for the item which needs to be located. In step 118, the system can read the code for the item from memory, and in step 120 a coded interrogation signal is transmitted to one or more interrogation regions. In step 122, the coded interrogation signal triggers a response by the item tag and in step 124 a detector within the region senses a response. Finally, in step 126, the detector transmits a signal to the system (which can be displayed or otherwise communicated, e.g. by voice, to the user) to report the location of the item.

It should be appreciated that various modifications can be made to the basic system reported above. For example, the system (or a microprocessor-based controller) can initiate periodic census-taking and store such data in memory. An inquiry can initially be met with information about the last known location of the item. Alternatively, the system simply can interrogate the last known location and, if the item is found there, report back to the user without any need to poll other locations. Moreover, the system can be used to simply sort out classes of items and ensure that there are no misplaced items within a particular interrogation zone (e.g., California-bound luggage in the cargo hold of a Europe-destined flight).

Figure 13:
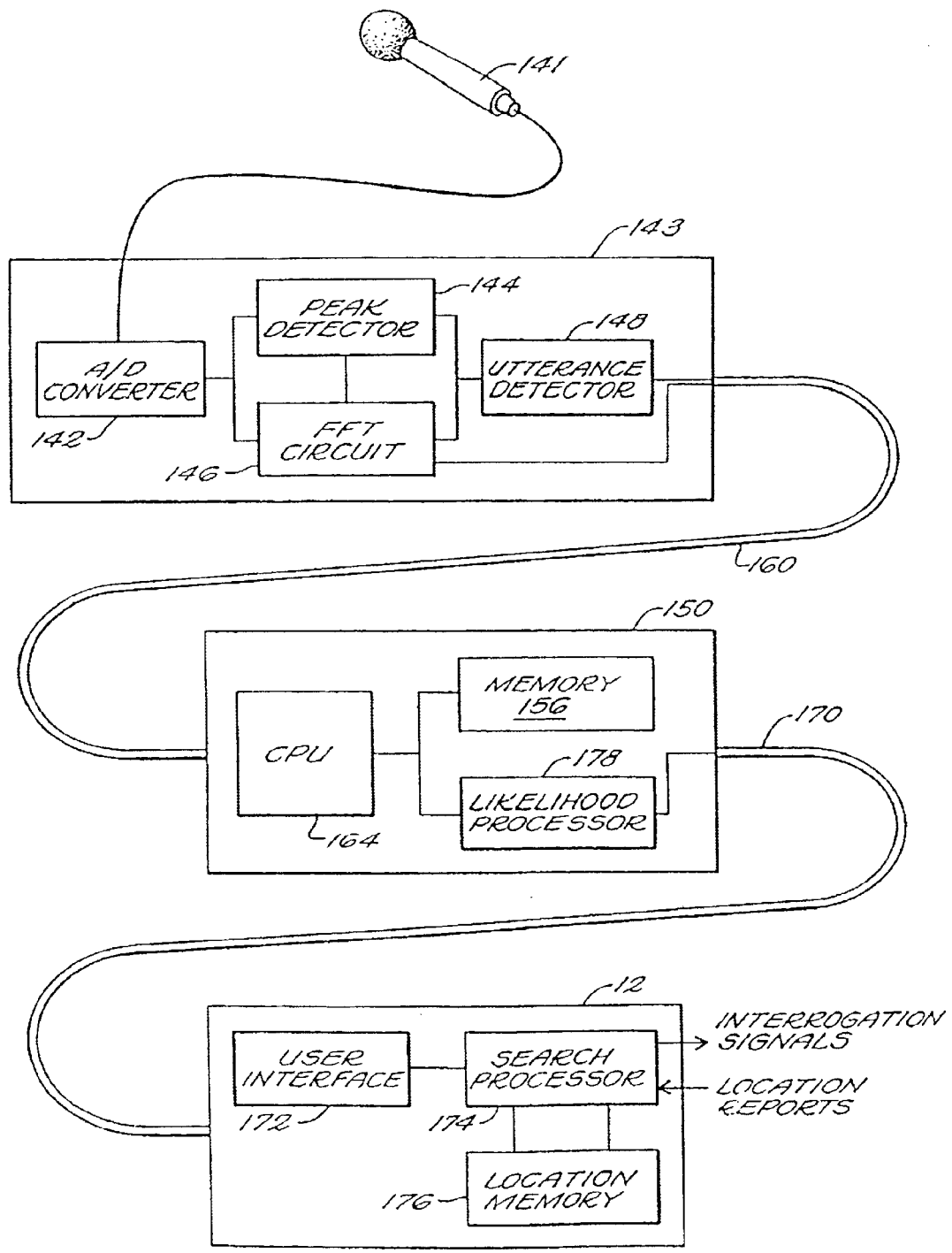
FIG. 13 is a schematic diagram of a voice recognition system for use in the present invention.

In FIG. 13, a system is shown for voice recognition of inquiries and other instructions in accordance with the present invention. Speech recognition systems typically operate by matching an acoustic word model with an acoustic signal generated by an utterance of the word to be recognized. In many such systems, the acoustic signal generated by a speaker is converted by an A/D converter into a digital representation of the successive amplitudes of the audio signal created by the speech. The resulting signal is transformed into a frequency domain signal which consists of a sequence of frames, each of which provides the amplitude of the speech signal across a spectrum of frequency bands. Such systems commonly operate by comparing the sequence of frames produced by the utterance to be recognized with a sequence of nodes, or frame models, as postulated in the acoustic model of each word in their vocabulary.

Since the individual sounds which make up a given word are seldom spoken at exactly the same relative rate or in exactly the same manner in any two utterances of that word, techniques have been developed in the prior art which have greatly improved the performance of speech recognition systems. The first is probabilistic matching, which determines the likelihood that a given frame of an utterance corresponds to a given node in an acoustic word model. It determines this likelihood not only as a function of how closely the amplitudes of the individual frequency bands of the frame match the expected frequencies contained in the given nodes, but also as a function of how the deviation between the actual and expected amplitudes compares to the expected deviations for such values. Such probabilistic matching gives a recognition system a much greater ability to deal with the variations in speech sound which occur in different utterances of the same word, as well as a greater ability to deal with the noise which is commonly present during speech recognition tasks.

The second major technique which can improve the performance of such frame matching systems is dynamic programming. In essence, dynamic programming provides a method to find an optimal or near optimal match between the sequence of frames produced by an utterance and the sequence of nodes contained in the model of a word. It does this by effectively expanding and contracting the duration of each node in the acoustic model of a word to compensate for the natural variations in the duration of speech sounds which occur in different utterances of the same word. Both probabilistic matching and dynamic programming are well known in the art and software-driven systems which provide highly efficient speech recognition based upon these and other principles are available from a number of commercial sources including for example, Dragon Systems, Inc. of Newton, Mass. In the present invention, such speech-recognition systems can be advantageously employed to further simplify the task of locating and/or retrieving items. Voice-activated systems are particularly useful in applications where keyboard entry of location requests is awkward or undesirable.

Referring now to FIG. 13, a schematic block diagram is shown of the hardware used in a speech recognizing embodiment of the invention. This system includes speech processing means 143 for detecting the utterance of a spoken word and for converting that utterance into digital signals to which a computer can respond. These means include a microphone 141, an A/D converter 142, a peak-amplitude detector 144, a fast-Fourier-transform (or "FFT") circuit 146, and an utterance detector 148. The signals produced by these means are supplied to a programmable computer 150, such as, for example, an Intel® processor-based, personal computer. In one embodiment, the system acknowledges search requests orally, e.g., by confirming with a synthetic spoken reply. The computer is provided with a video monitor (not shown) to display words recognized by it, and a keyboard (not shown), to enable an operator to communicate with the computer by means other than voice. The monitor, the keyboard, and their respective interfaces to the computer 150, can be of a type commonly used with personal computers. Alternatively, the microphone, display and/or keyboard functions can be integrated into a desk telephone apparatus under the control of a similar microprocessor either housed within the telephone apparatus or centrally located and connected to plurality of telephones by an intraoffice telephone link or network.

The output of the microphone 141 is connected to the input of the A/D converter 142. The A/D converter converts the analog signal produced by the microphone 141 into a sequence of digital values representing the amplitude of the signal produced by the microphone 141 at a sequence of evenly spaced times. For example, the A/D converter 142 can be a fourteen-bit converter with a sampling rate of 6000 hertz. The output of the A/D converter 142 is supplied to the inputs of the peak-amplitude detector 144 and the FFT circuit 146.

FFT circuitry is well known in the art of digital signal processing. Such circuitry converts a time domain signal, which gives the amplitude of a given signal over a succession of times, into a frequency domain signal, which gives the amplitudes of the given signal at each of a plurality of frequency bands during each of a succession of time periods. In the preferred embodiment, the FFT circuit 146 converts the output of the A/D converter 142 into a sequence of frames, each of which indicates the amplitude of the signal supplied by the A/D converter in each of eight different frequency bands. In one embodiment, FFT circuit 146 can produce one such frame every 50th of a second.

As is well known in the art of digital signal processing, the output of FFT circuitry is generally improved if it includes means for properly windowing the sequence of amplitude values which is fed to it for the calculation of each frame. Such windowing tapers values near the beginning and end of the sequence used for the computation of a given frame, thus reducing the effect of discontinuities at the boundaries of the sample period upon the Fourier transform produced by the FFT circuit. In the preferred embodiment the FFT circuit 146 uses a type of windowing function known in the art as a Hamming window.

The FFT circuit 146 can produce, for example, a vector of values corresponding to the energy amplitude in each of eight frequency bands. The FFT circuitry 146 converts each of these eight energy amplitude values into an eight-bit logarithmic value. This reduces subsequent computation since the eight-bit logarithmic values are more simple to perform calculations on than the longer linear energy amplitude values produced by the fast Fourier transform, but represent the same dynamic range. Ways for providing logarithmic conversions are well known in the art, one of the simplest being to use a look-up table in memory. Other modifications of the FFT process, such as averaging and normalization, can also be employed to simplify the speech signal.

The FFT circuit 146 produces an output of one frame every fiftieth of a second. This output is supplied via bus 160 of the computer 150. The FFT circuit 146 also supplies an interrupt signal on an output line which is connected through the system bus 160 to the CPU 164 of the computer 150. In response to the interrupt produced by the FFT circuitry, CPU 164 reads the data provided for each successive frame and stores it in a random access memory 156. The FFT circuitry 146 also supplies frame clock signals to the peak amplitude detector 144 and the utterance detector 148.

The peak-amplitude detector 144 includes circuitry of a type well known to those skilled in the digital arts, for storing the highest amplitude value produced by the output of the A/D converter 142 during each frame time indicated by the frame clock signal from the FFT circuit 146.

The utterance detector 148 can further include a comparator for comparing the peak amplitude of the output of and A/D converter 142 during a given frame, as determined by the peak-amplitude detector 144, with a predetermined threshold value supplied to a second input of that comparator. In one preferred embodiment this threshold is set to a value approximately four times higher than that associated with normal background sound. It is set to this value by computer 150 over lines which are not shown in the figures. During any frame period in which the peak amplitude exceeds the given threshold, the output of the comparator produces a high value.

The computer 150 can be any one of a great number of types of computer, since most general purpose computers can be programmed to function in a similar manner, provided they have sufficient memory and sufficient computational power. The likelihood processor 178 can be implemented by various means. See, for example, the discussions of likelihood processors contained in U.S. Pat. No. 4,783,803, the disclosures of which are incorporated herein by reference.

As will be clear to those skilled in the computer arts the decision as to what computational elements of the present invention should be performed with special-purpose hardware and which should be performed in software will depend upon the exact function and market which the system is designed to fill, and that decision will vary over time as the size, capability, and cost of hardware change. Thus for example, it should be understood that a high percent of the computational tasks performed by the present invention could be performed in special-purpose hardware, as well as in software, and that many of the tasks which are performed in hardware in the preferred embodiment described here could be performed in software, if desired.

As is described above, the FFT circuit 146 converts the sound occurring in a given twenty millisecond period into a frame which indicates the energy amplitude in each of several (e.g., eight) spectral bands during that period. This frame can be represented as a vector of eight amplitude parameters. Each of the eight parameters actually corresponds to a logarithm of its corresponding energy amplitude value.

In the probabilistic frame matching method used in one preferred embodiment of the present invention, each frame produced by an utterance is matched against a succession of frame-like nodes contained in the model of each word of an active vocabulary. Each node has a separate probability distribution associated with each of the eight parameters of a frame. Each of the probability distributions associated with a given parameter has a mean value, $\mu$, which indicates a statistically derived expectation of the most probable value for the corresponding frame parameter during a given utterance of that node. In addition, each node contains for each frame parameter a σ, which is a statistically derived indication of the likely deviation of the value of that given frame parameter from the expected value, μ, during the utterance of the node.

The μ and σ car for each parameter of each node in a word model can be derived by statistical techniques. For example a plurality of utterances of a given word can be divided into a plurality of nodes by a human listener playing back a recording of each word at a slow pace. Then the value of μ and σ can be calculated for each node by standard statistical techniques. More efficient automatic methods of deriving node models are also available.

The computational structure of likelihood processor 178 typically involves two major sequential components which are performed after the utterance of a word has been detected. First a rapid match computation is performed to derive from an initial vocabulary a smaller, originally active, vocabulary containing the words which appear to have a reasonable chance of matching the detected utterance. Then, after the rapid match computation, a more lengthy and accurate word match computation is performed upon each of the words in the originally active vocabulary. The application of speech recognizing techniques as described above to electronic location systems is facilitated by the limited active vocabulary that is needed to fulfill a search request. Typically, the user simply utters an ID number associated with the object, e.g. "Find File TJE-001." Next, the computer the recognizes the request, confirms it by repeating the best match (as determined by the likelihood processor) and then executes the instruction by signaling the controller to begin a search of the various interrogation zones.

Computer 150 is connected via bus 170 to controller 12 which includes a user interface 172 (e.g., a video display and/or a synthetic speech generator and speaker in order to confirm the search request) and a search processor 174, which generates interrogation signals and decodes tag responses, as discussed above. Data on the location of items from either a specific search request or periodic census-taking can be stored in location memory 176.

I claim:

1. A system for locating an object comprising:
    at least one transmitter for transmitting of an electromagnetic interrogation signal within each of a plurality of defined interrogation zones;
    at least one tag adapted for attachment to an object, the tag being responsive to said electromagnetic interrogation signal and comprising
        a signal receiving structure adapted to capture at least a portion of the energy of said interrogation signal, and
        a response generator for generating a responsive signal to announce the presence of the object within an interrogation zone;
    a plurality of receivers, each associated with one of the interrogation zones for detecting said responsive signal from said tag, if present, within its interrogation zone;
    a controller for periodically activating the at least one transmitter to conduct a census of tagged objects within the interrogation zones;
    a data storage device for recording the results of the census as a location inventory that identifies tagged objects as present in one of said interrogation zones; and
    a search processor that responds to a user initiated search for specific tagged object by first checking the data storage device for a last known location of the object in the location inventory and activating at least one of the transmitters to confirm and update the location of the tagged object based on a responsive signal from a receiver associated with the zone in which the object is located.

2. The system of claim 1 wherein the transmitter further comprises a modulator that varies the frequency of signals generated by an electromagnetic radiation signal generator in accordance with a control signal from the controller.

3. The system of claim 1 wherein signal receiving structure further comprises a tank circuit tuned to a frequency of the electromagnetic signal.

4. The system of claim 1 wherein signal receiving structure further comprises a piezoelectric crystal transponder.

5. The system of claim 1 wherein signal receiving structure further comprises a magnetorestrictive element.

6. The system of claim 1 wherein the transmitter further comprises
    a digital code generator that encodes an electromagnetic radiation signal in accordance with a control signal from the controller.

7. The system of claim 1 wherein the transmitter generates a coded interrogation signal addressed to a specific tag ID.

8. The system of claim 1 wherein the system further comprises a user interface for entering requests for location of particular tagged objects.

9. The system of claim 8 wherein the user interface is incorporated into a computer terminal.

10. The system of claim 1 wherein the system further comprises a display for displaying information on a tagged object.

11. The system of claim 1 wherein the system further comprises a plurality of transmitters for interrogating different locations.

12. The system of claim 11 wherein the data storage device is adapted to store information on tagged objects in the plurality of locations.

13. The system of claim 12 wherein the system further comprises a user interface.

* * * * *